March 24, 1953

H. C. SHEPARD 2,632,370

TELEVISION CAMERA TURRET LENS SELECTING
AND FOCUSING APPARATUS

Filed July 13, 1951

INVENTOR
HERBERT C. SHEPARD
BY
ATTORNEY

Patented Mar. 24, 1953

2,632,370

UNITED STATES PATENT OFFICE 2,632,370

TELEVISION CAMERA TURRET LENS SELECTING AND FOCUSING APPARATUS

Herbert C. Shepard, Woodbury, N. J., assignor to Radio Corporation of America, a corporation of Delaware Application July 13, 1951, Serial No. 236,577

14 Claims. (Cl. 95—45)

This invention relates to television cameras such as those used in certain color television systems and particularly to the apparatus used for the adjustable control of some of the optical elements used therein.

A television camera includes at least one signal-generating tube which is responsive to light derived from the subject and which is directed to the photo-sensitive electrode of the tube by suitable optical apparatus. The usual television camera employed in black and white systems is provided with a plurality of objective lenses mounted in a turret at the front of the camera in such a way as to enable the operator to rotate the turret for the selection of the proper lens. Ordinarily, these lenses are of relatively short focal length so that the signal-generating tube may be mounted in such a way that its photo-sensitive electrode is at a comparatively short distance from the lens.

In such a camera, the only movement to which the turret-mounted objective lenses are subjected is one of rotation about the window of the camera as the desired lens is selected for use by the operator. Focusing with any selected lens usually is accomplished by moving the signal-generating tube closer to, or farther from, the lens. In a conventional black and white television camera, usually both of these types of control of the optical components may be readily accomplished by the operator positioned at the rear of the apparatus.

However, in a color television system in which the color representative video signals are to be developed simultaneously, or substantially so, it generally is customary to provide a signal-generating tube for each of the image colors. In such apparatus it is necessary to employ an optical system by means of which to separate the light into the primary colors of the subject so as to be able to direct the light of the different colors properly to the respective signal-generating tubes. A particularly efficient device of this character is an arrangement of dichroic reflectors. Representative examples of this type of color selective apparatus are shown in U. S. patents to Glenn L. Dimmick, 2,379,790 granted July 3, 1945, and titled "Dichroic Reflectors" and 2,412,496 granted December 10, 1946, and titled "Color Selective Reflector."

When a light separator of the dichroic reflector type is used in a color television camera there is not enough space in which to mount it between the standard turret-mounted objective lens and its image plane. Accordingly, if the standard objective lenses normally provided with a black and white television camera are to be used in the described type of color television camera, it is seen that additional optical apparatus must be provided in order to gain space for the mounting of the dichroic reflectors. One representative type of auxiliary optical system which has been successfully employed for the purpose described includes a field or condensing lens mounted substantially in the image plane of the standard objective lens and an image relaying lens system located between the field lens and the dichroic reflectors. The relaying lens system functions to transfer the image formed in the plane of the field lens to the respective planes of the target electrodes of the different color representative signal generating tubes. Such an optical system forms the subject matter of a copending application of L. T. Sachtleben and G. L. Dimmick, Serial No. 215,722 filed March 15, 1951, and titled "Color Television Optical System." It is seen that, with such an arrangement, it is not practicable to effect the desired focusing of the camera system by moving the signal-generating tubes relative to the objective lenses.

Accordingly, it is an object of the present invention to provide control mechanism for some of the optical components of a color television camera employing a plurality of signal-generating tubes and a colored light separator.

Another object of the invention is to provide mechanism for rotating a lens turret for lens-selecting purposes and for moving the lens turret back and forth for focusing purposes in any of its lens-selecting positions.

Still another object of the invention is to provide apparatus for indexing the lens turret of a television camera at any one of a plurality of lens-selecting positions and at any point in the back and forth movement of the turret effected for focusing.

A further object of the invention is to provide adjustable facilities for fixing the positions of the turret for each objective lens, as it is rotated to "operating position," so as to correspond with a master detent located at the rear of the camera, whereby to provide good optical alignment of the apparatus and to minimize looseness or shakiness in the turret positioning of a character to adversely effect the results.

A television camera of the character embodying the present invention includes a field lens for each of the turret-mounted objective lenses. These lenses are of the spherical type and are selected to have the proper diopter power for the objective lens with which it is to function. The purpose of the field lens is to so confine the light rays from the objective lens that they will not scatter appreciably before reaching the relatively long focal length relay lenses and the dichroic reflector apparatus. It is seen then that each objective lens requires its own individual field lens, and, therefore, is necessary to mount the field lenses on a rotatable spider or wheel so that they may be rotated together with the objective lenses with which they are associated.

Accordingly, it is another object of the present invention to provide mechanism for the accurate rotational driving of the field lens wheel in conjunction with the objective lens turret at any focusing position of the turret.

Still another object of the invention is to provide apparatus for the precise rotational positioning of the field lens wheel so that the field lenses may be optically aligned with their respective turret-mounted objective lenses.

The television camera embodying the present invention is provided with a turret in which the objective lenses are mounted and which is attached to a spindle that is arranged to be rotated and moved longitudinally of its axis. The turret spindle is linked to a shaft extending through the rear end wall of the camera housing and attached to a handle by which it may be rotated for imparting a rotating movement to the turret. Also, the turret spindle is linked to a focusing tube which is mounted outside of, and concentric with, the turret shaft and which extends toward the rear of the camera housing. The focusing tube is moved longitudinally of its and the turret shaft axis by means of a mechanism extending to the outside of the camera housing. By this means the turret may be moved back and forth for focusing purposes in any one of its lens-selecting positions.

The apparatus also includes a spider or wheel in which the field lenses are mounted and which is linked to the turret spindle for rotation therewith so that the field lenses always are associated respectively with particular ones of the objective lenses. A rotational driver for the field lens wheel is provided with a sort of slip joint so that the field lens wheel is not moved longitudinally of the axis of the system when the turret lens assembly is moved in this manner for focusing purposes.

The apparatus in accordance with the present invention also includes a facility for properly indexing the lens turret in any one of its selected positions and at any point in its longitudinal travel. The indexing apparatus also includes a plurality of detents spaced about the periphery of the turret for cooperation with an aperture provided in a stationary drum support for the turret. In order that the detents may be effective in any longitudinal position of the turret, the drum aperture is elongated in the direction of the axis of the camera. Also, this aperture is made light-tight so as not to interfere with the operation of the optical system.

Furthermore, in accordance with the apparatus embodying this invention, the indexing detents are adjustable so as to make them coincide in their operation with a master detent located at the rear of the camera and associated with the turret-rotating handle when the optical apparatus is properly aligned in each of the rotational positions of the turret. Such a facility insures a more positive and rigid indexing of the turret than would be the case if complete reliance were placed upon the master detent in the rear of the camera.

The apparatus also includes a type of mounting for the field lens wheel by which it is linked to the turret spindle so that it may be adjusted for rotation with sufficient precision that a good optical alignment of the field lenses with their respective objective lenses may be effected. Each of the field lenses, furthermore, may be mounted or dis-mounted in the field lens wheel without disturbing either the focal adjustment or alignment of the system. The camera mechanism also includes an arrangement by which the field lenses may be reached for mounting and dismounting with comparative ease and rapidity by removing the objective lens turret from the front of the camera.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figures 1, 8:
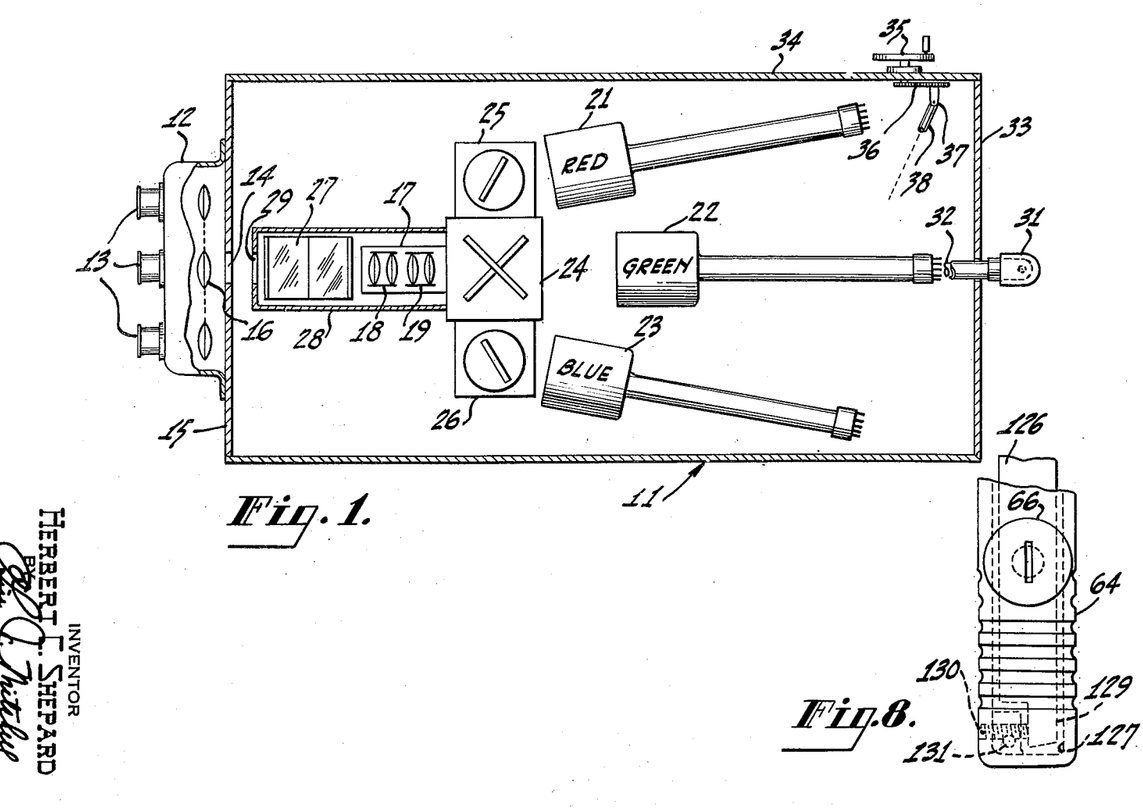
Figure 1 is a diagrammatic plan view of the general arrangement of a color television camera in which the present invention may be embodied.
Figure 8 is a detail view of the turret-rotating mechanism showing another feature of the invention.

Reference first will be made to Figure 1 for a description of the general type of color television camera in which the present invention is embodied. The camera includes a light tight housing 11 at the front end of which is mounted, in a manner to be described in greater detail subsequently, a turret 12 in which are mounted a plurality of objective lenses 13. As previously indicated, the turret 12 is adapted to be rotated so as to bring selected ones of the objective lenses 13 into alignment with an opening or window 14 in the front end wall 15 of the camera housing. Field lenses such as the lens 16 are provided for the respective objective lenses 13. The field lenses are located in the focal planes of the comparatively short focal length objective lenses respectively associated therewith. The field lenses function to effectively transfer the image formed in the focal plane of the objective lens to a relatively long focal length image-relaying lens system 17.

As disclosed in greater detail in the copending application of Sachtleben and Dimmick referred to previously, the image-relaying apparatus comprises two relatively long focal length objective lenses 18 and 19 mounted respectively on the normally infinity conjugate side of one another. A substantially unit magnification is effected by this means. The image-relaying apparatus 17 functions to relay the image to the photo-sensitive electrodes of each of a plurality of signal-generating tubes such as the red, green and blue tubes 21, 22 and 23. These tubes are located relative to the optical system in such a way that the light paths to the tubes are substantially equal.

The light from the subject is separated into its primary colors by a color-selective apparatus 24 comprising a pair of dichroic reflectors arranged respectively at approximately 45 degree angles to the axis of the system. By such means the green subject light is transmitted by the color separator 24 directly to the green tubes 22. The red light is reflected to one side by the color selecting apparatus 24 and is directed by a mirror 25 to the red tube 21. Similarly, the blue light from the subject is reflected to the other side for further reflection by the mirror 26 to the blue tube 23.

The optical system also includes an astigmatism corrector 27 located between the field lenses 16 and the image-relaying apparatus 17. As described in greater detail in the copending application of Sachtleben and Dimmick referred to, the angular relationship of the dichroic reflectors of the light separator 24 produce astigmatic images at the camera tubes 21, 22 and 23. This astigmatism may be corrected by introducing another pair of plates similar to those included in the dichroic reflectors, also mounted at substantially the same angles to the axis of the system as are the dichroic reflectors of the light separator 24 but rotated about the axis through an angle of 90 degrees. It is seen that one set of plates creates astigmatism in one dimension and the other set in the other dimension, so that the two combined sets compensate for one another. The astigmatism corrector 27 and the image-relaying apparatus 17 are mounted in a housing 28 which is provided with a front window or aperture 29 in alignment with the window 14 in the camera housing and also with a suitable opening (not specifically indicated) communicating with the light separator 24.

The camera also is provided with lens-selecting mechanism including a turret-rotating handle 31 attached to a turret shaft 32 extending rearwardly through the rear end wall 33 of the camera housing 11 and forwardly to a linkage (not shown in Figure 1) with the turret 12 and which will be described subsequently in more detail. Also attached to one of the side walls 34 of the camera housing 11 is a crank or focus knob 35 constituting an operating handle for a focusing mechanism. The focus knob is coupled by a gear train 36 and a universal joint 37 to a drive shaft 38. The drive shaft is further coupled to the focusing mechanism to be subsequently described in greater detail for effecting a longitudinal movement of the turret 12.

Figures 2, 6, 7:
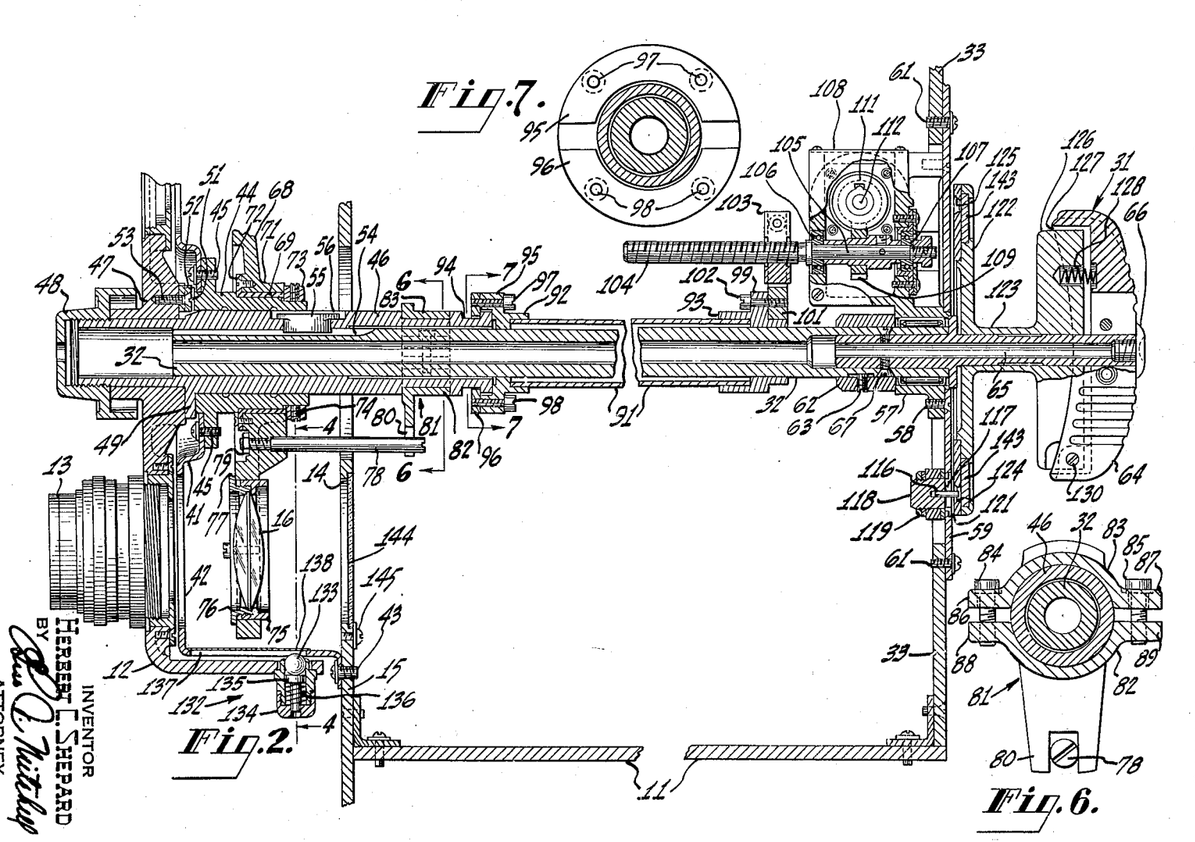
Figure 2 is a partial sectional view of the control mechanism for the optical components of the television camera embodying the invention.
Figure 6 is a fragmentary sectional view taken along the lines 6—6 of Figure 2 and shows additional details of the rotational driving mechanism for the field lens wheel in accordance with the invention and which are illustrated from a different viewing angle than that of Figure 2.
Figure 7 is another fragmentary sectional view taken along the line 7—7 of Figure 2 showing additional details of the mechanism by which longitudinal movement of the turret spindle is effected according to a feature of this invention.

Reference next will be made to Figure 2 of the drawings for a somewhat more detailed description of the adjustable television camera optical apparatus embodying the present invention. The view of the camera apparatus shown in this figure is a partial vertical cross section. It will be understood that this view of the apparatus is broken between the front and rear end walls of the housing and foreshortened in order to simplify somewhat the illustration of the essential details of the apparatus. The front end wall 15 of the housing 11 has attached thereto a turret-supporting drum 41 which extends forwardly and is provided with an aperture 42. This aperture is substantially in alignment with the aperture 14 in the front end wall of the housing. The drum 41 is secured to the front housing wall 15 by means of a plurality of screws such as the screw 43. The turret-supporting drum provides a means of support for a main bearing 44. This bearing is attached to an inwardly formed boss on the drum 41 substantially at the center thereof by means of a plurality of screws such as 45.

A turret spindle 46 is journaled in the main bearing 44 and extends both forwardly and rearwardly therefrom. The forward end of the spindle 46 is formed suitably to receive a centrally located hub 47 with which the turret 12 is provided and also is threaded adjacent its extremity to receive a turret-holding thumb nut 48. The thumb nut serves to securely press the turret hub 47 against a flange 49 formed on the turret spindle 46. The flange 49 has a slot or recess 51 formed therein to receive a substantially rectangular turret-locating key 52 which is attached to the rear face of the turret hub 47 by a screw 53. By means of the key and slot arrangement, the turret may be accurately located on, and is constrained to rotate with, the spindle 46. Also, by means of the described mounting of the turret between the thumb nut 48 and the flange 49, the turret is movable longitudinally with the spindle.

The turret spindle 46 is hollow so as to permit the mounting internally thereof of the turret shaft 32. A longitudinal slot 54 is formed in the outside of the turret shaft adjacent its forward end. This slot is adapted to receive a key 55 extending through a suitable aperture 56 in the turret spindle. By this means the turret shaft is linked to the turret spindle for rotative movement therewith in such a manner that a relative longitudinal movement of the spindle and the shaft may be effected.

As indicated in the foregoing description of Figure 1, the turret shaft 32 extends rearwardly and is linked to an externally located turret-rotating handle mechanism 31. The turret shaft 32 is journaled adjacent its rear end in a bearing 57 which is attached by means of a plurality of screws such as 58 to an end, or detent, plate 59 which in turn is secured to the rear end wall 33 of the housing 11 by means of a plurality of screws such as 61. Longitudinal movement of the turret shaft 32 is restricted by means of a collar 62 encircling the shaft and securely attached thereto by means of a set screw 63. The handle mechanism 31 includes a hand grip 64 which is attached to an extension shaft 65 extending through a centrally located aperture in the end plate 59 by means of a screw 66. The extension shaft is inserted in the rear hollow end of the turret shaft 32 and is secured thereto by a plurality of screws such as 67.

It is seen that by reason of the mechanism described up to this point, a rotative movement of the handle mechanism 31 effects a corresponding rotative movement of the turret 12. By such means, any selected one of the objective lenses 13 may be aligned with the aperture 42 of the turret supporting drum 41 and the aperture 14 of the end wall 15. It will be understood that the other optical apparatus such as described generally in connection with Figure 1 also is in alignment with these apertures.

The apparatus also includes a field lens wheel 68 which is adapted to mount the plurality of field lenses such as 16 for cooperation with the associated objective lenses 13 mounted in the turret 12. A lens wheel bearing 69 is mounted internally of the hub 71 of the field lens wheel 68 by means of a plurality of screws such as 72. The lens wheel bearing 69 is adapted to be mounted on an external portion of the main bearing 44 and is held securely at its forward end against a suitably formed shoulder in the main bearing by means of a retaining collar 73 secured to the main bearing means of a plurality of screws such as 74. The mounting of the field lens wheel 68 on the main bearing 44 in the manner described permits the wheel to be rotated about the turret shaft axis but prevents the longitudinal movement of the lens wheel relative to the turret supporting drum 41.

Each of the field lenses such as the lens 16 is mounted in the lens wheel 68 between two complementary lens holders 75 and 76. These lens holders are adapted to be screwed together as indicated so as to securely grip the lens 16 adjacent its peripheral edge. The front lens holder 76 is provided with a flange 77 which is adapted to abut the front face of the lens wheel 68 enabling the remainder of the lens holding structure to extend through a suitably formed aperture in the wheel toward the rear of the camera.

In order to effect rotation of the lens wheel 68 concurrently with the rotation of the turret 12, there is provided a driving stud 78 which is attached to the lens wheel by a nut 79 engaging a threaded end portion of the stud, the body of which extends rearwardly of the camera apparatus. The stud is engaged by the forked end portion 80 of a driver mechanism 81 (see also Figure 6). The driver mechanism also includes a two-part arcuate clamp, one part 82 of which is secured to the forked portion 80 and the other part 83 of which is detachably fastened to the part 82 by means such as screws 84 and 85 extending respectively through clearance holes in lugs 86 and 87 extending from the ends of the clamp part 83 into correspondingly located tapped holes in lugs 88 and 89 extending from the ends of the clamp part 82. By means of the clamp, the driving mechanism 81 is securely mounted on the turret spindle 46 in a suitable annular recess formed therein.

By means of the described linkage extending from the turret-rotating handle mechanism 31 through the turret shaft 32, the turret spindle 46 and to the field lens driving mechanism 81, it is seen that rotation of the handle causes the rotative movement of the forked driving mechanism 81 about the axis of the turret shaft. This, in turn, causes the rotative movement of the stud 78 and, as a consequence, the field lens wheel 68 also about this axis. Accordingly, it is seen that, as the turret 12 is rotated to selectively align the desired objective lens with the remainder of the optical apparatus, a concurrent alignment of the field lens associated with the selected objective lens also is effected.

The camera apparatus also includes a focus tube 91 which is tubular in form and adapted to extend coaxially with, and on the outside of, the turret shaft 32. The focusing tube is provided at its forward end with a front bearing 92 which is generally annular in form and is secured to the tube by suitable means such as brazing. Similarly, there is provided a rear bearing 93 for the focusing tube. Both of the bearings are provided with internally extending shoulder portions adapted to bear upon the outer surface of the turret shaft 32 and thereby to provide journaling for the focusing tube.

Adjacent the rear end of the turret spindle 46, there is formed therein an annular recess 94. A pair of arcuate connecting shoes 95 and 96 (see also Figure 7) are attached to the front focus tube bearing 92 by means of a plurality of screws such as 97 and 98. These shoes are adapted to engage the annular recess 94 in the turret spindle 46 so as to impart longitudinal movement thereto by a corresponding longitudinal movement of the focus tube 91.

The rear focus tube bearing 93 is provided with a shoulder 99 providing a support for a bearing holder 101 which is attached to the shoulder by means of a plurality of screws such as 102. The bearing holder 101 extends upwardly from the rear focus tube bearing 93 and serves to support a self-aligning bearing 103 in such a manner that it is adapted to rotate about a vertical axis and also about a horizontal axis parallel to the axis of the focus shaft 91. The bearing 103 is provided with an internally threaded aperture adapted to engage an externally threaded driving spindle 104 extending substantially parallel to the focus tube 91. The spindle 104 is provided with a rearwardly extending pinion gear shaft 105 which is journaled in bearings 106 and 107 mounted in a gear drive mechanism 108. The pinion gear shaft 105 has mounted thereon a pinion gear 109 which is adapted to engage with a worm gear 111. The worm gear, in turn, is mounted on a shaft 112 which is journaled in bearings 113 and 114 in the gear drive mechanism 108. The worm gear shaft 112 is linked by a universal joint 115 to the drive shaft 38 and the rest of the focusing mechanism including the knob 35 located on the outside of the housing 11 as previously described in connection with Figure 1.

The focusing mechanism operates by manipulation of the crank or focus knob 35 imparting rotative movement to the shaft 112 which, through the medium of worm and pinion gears 111 and 109, respectively, causes a rotative movement of the driving spindle 104. Rotation of this spindle causes the internally threaded bearing 103 to be moved longitudinally of the spindle 104, thereby imparting a longitudinal movement to the focus tube 91. This, in turn, by means of the described linkage to the turret spindle 46, effects a corresponding longitudinal movement of the turret spindle and, as a consequence, the turret 12. It is seen that by means of the key 55 and the longitudinal slot 54 a relative longitudinal movement between the turret spindle 46 and the turret shaft 32 may be effected in any rotative position of the shaft 32 and the turret 12. It also is seen that a longitudinal movement of the turret spindle 46 may be effected without causing a longitudinal movement of the field lens wheel 68 because of the fact that the driving fork 80 may slide longitudinally relative to the stud 78. The abutting engagement of the turret spindle flange 49 with the front end of the main bearing 44 determines the rearmost focusing adjustment of the turret. In a like manner, the abutting engagement of the two-part clamp of the driving mechanism 81 with the rear end of the main bearing determines the foremost focusing adjustment of the turret.

The lens-selecting mechanism including the turret rotating handle 31 is provided with a master detent and indexing apparatus by means of which to insure correct positioning of the turret mounted objective lenses 13 in any rotated position of the turret 12. This mechanism includes the detent plate 59 previously referred to. The master detent itself consists of a disc-like roller 116 secured to a shaft 117 which in turn is securely anchored in a threaded bushing 118 inserted in a suitable aperture in the plate 59 and held therein by a plurality of lock nuts such as 119 against a flange 121 formed in the outer end of the bushing.

For cooperation with the master detent roller 116, there is provided a detent release ring 122 which has a shank portion 123 extending rearwardly therefrom. The release ring is provided on its inner face with a plurality of recesses such as 124 and 125. Each of these recesses is adapted to receive the master detent roller 116. There are provided the same number of detent-receiving recesses as there are turret-mounted objective lenses 13. Also, these recesses are located in the release ring 122 in such positions that they are in engagement with the master detent whenever one of the objective lenses is substantially in alignment with the remainder of the optical system.

For operation of the release ring 122 there is provided a detent-releasing bar 126 attached to the outer end of the shank 123. This bar is adapted to be received within a recess 127 formed on the inner side of the hand grip 64. The bar 126 is urged toward a position out of the recess 127 by means of one or more compression type springs such as 128 suitably mounted in indentations formed respectively in the releasing bar and in the hand grip substantially as shown. Since the hand grip 64 is mounted in the manner described, it is seen that there is a fixed spatial relationship between it and the camera housing 11. Accordingly, by means of the described relationship of the hand grip and the detent releasing bar 126 and its attachment to the detent-releasing ring 122, it is seen that this ring is urged by the springs such as 128 to a position adjacent the end wall 33 of the camera housing. In this position the recesses such as 124 are engaged with the master detent roller 116, thereby securely fixing the rotative positions of the release ring 122 and the detent-releasing bar 126.

It is also necessary to fix the rotative position of the hand grip 64 so that the rotative position of the turret 12 also will be similarly fixed. It is seen, therefore, that, in order to effect this latter result, it is necessary to prevent any substantial relative rotative movement between the hand grip 64 and the detent-releasing bar 126.

Accordingly, the recess 127 formed in the hand grip 64 is made somewhat larger than necessary to receive the detent-releasing bar 126. Also, as shown in Figure 8 to which additional reference is made, the bar is undercut at a plurality of points, such as at both ends, to provide portions such as 129 which are of less than the overall thickness of the bar. A plurality of substantially flat-ended screws, such as 130, are threaded through the sides of the hand grip 64 so as to be adjustable to bear upon the undercut portions 129 of the bar 126. The end of the screw 130 and the associated surface of the undercut portion 129 preferably are machined to have comparatively smooth surfaces. The screw is adjusted so as to bear upon the undercut portion 129 sufficiently to prevent relative rotative movement between the bar and the hand grip and at the same time to permit comparatively easy in and out sliding movement of the bar in the recess.

In order to fix the screw 130 in any of its adjusted positions, a fibre pin 131 is driven into a suitably located hole in the hand grip so as to bear upon the threaded portion of the adjusting screw. It also may be seen that the described mechanism for linking the hand grip 64 and the detent-releasing bar 126 permits continual adjustment of the screws such as 130 so as to maintain the desired relationship for substantially the entire life of the apparatus, irrespective of the normal wear encountered in its operation.

It is seen that, in order to rotate the turret 12 to a different position for the selection of another objective lens 13, the lens-selecting mechanism 31 is gripped in such a manner that the detent-releasing bar 126 is drawn into the recess 127 in the hand grip 64 against the action of the springs such as 128, thereby dis-engaging the master detent roller 116 from one of the recesses such as 124 in the release ring 122. With the mechanism so gripped, it may be rotated by a twisting motion of the hand to effect the desired turret rotation. A release of the bar 126, when the turret is in a position close to a desired one, will enable the firm engagement of the master detent roller 116 with another one of the recesses such as 125, for example.

In view of the extraordinary length of the apparatus, it has been found desirable to provide adjustable detents at the forward end of the apparatus to provide additional stability of adjustment in cooperation with the master detent located at the rear of the apparatus. One of the adjustable detents 132 is shown in cross section in Figure 2 and includes a ball 133 mounted in a substantially cylindrical inwardly opening retainer 134. The retainer is attached to the turret 12 in a manner to be described subsequently. The ball 133 is supported by the end of a plunger 135 which is urged by a compression type spring 136 toward the interior of the turret 12. The detent ball 133 accordingly is adapted to engage a longitudnal slot 137 formed in the turret supporting drum 41. The inside of the slot 137 is provided with a cover 138, thereby sealing the slot from the interior of the camera apparatus and making the slot light-tight.

It is seen that, by virtue of the spherical shape of the detent ball 133, it may be forced out of the slot 137 against the action of the spring-pressed plunger 135 when the turret 12 is rotated relative to the drum 41. At the same time, so long as the turret is in one of its selected positions, one of the described detents prevents the turret from moving appreciably in a rotative sense relative to the supporting drum. Likewise, it is seen that, by virtue of the longitudinal slot in the supporting drum, the detents are adapted to operate in any focused position of the turret.

Figures 4, 5:
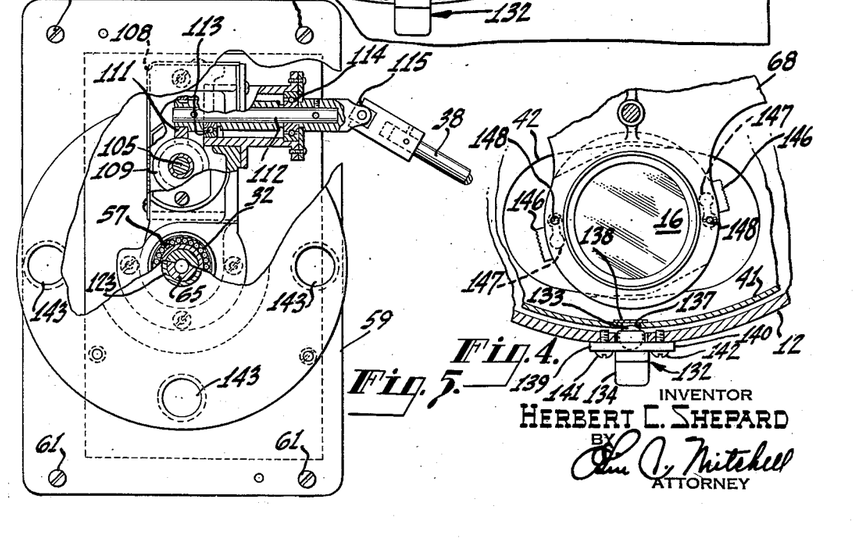
Figure 4 is a fragmentary sectional view taken along the line 4—4 of Figure 2 showing the details of the field lens mounting on the field lens wheel in accordance with the invention.
Figure 5 is a rear elevational view of a color television camera and is partially cut away to show in section certain of the details of the focusing linkage embodying the invention.

As shown more clearly in Figure 4, the cylindrical retainer 134 is provided with a pair of lugs 139 and 140 for mounting by means of screws such as 141 and 142, respectively, on the turret 12. The clearance holes provided for the mounting screws in the lugs 139 and 140 preferably are elongated in the direction of the outwardly extending lugs so that the detent retainer 134 may be adjusted somewhat radially of the turret 12. By this means a more precise adjustment of the location of the turret-mounted objective lenses may be effected.

Figure 3:
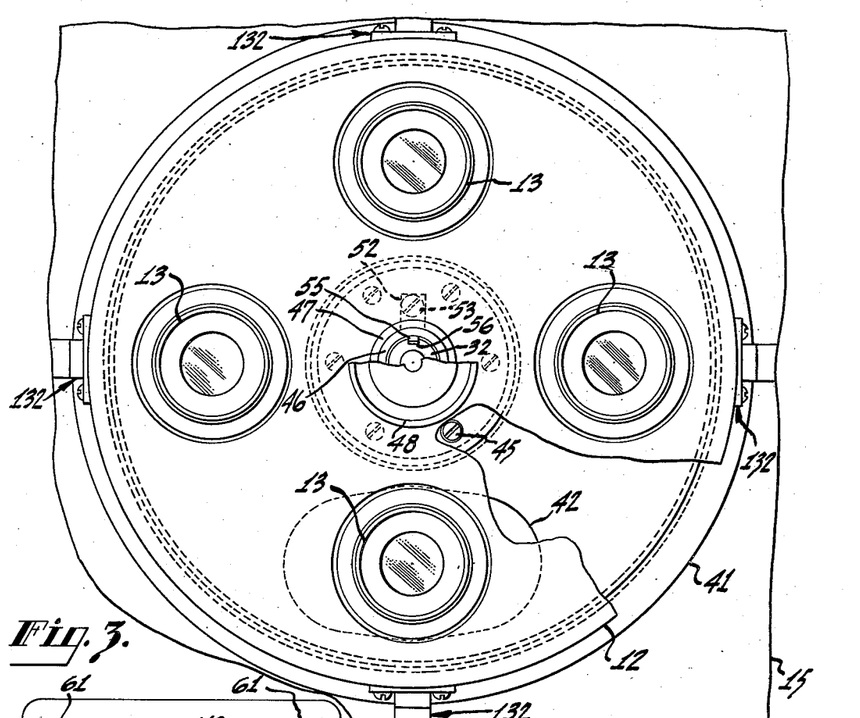
Figure 3 is a front elevational view of the camera embodying the invention and showing the arrangement of the objective lenses on the turret of a television camera.

In accordance with another one of the features of this invention, the turret 12 is provided with as many of the adjustable detents 132 as there are objective lenses mounted in the turret. For example, as more clearly shown in Figure 3 of the drawings, the turret is provided with four substantially symmetrically located objective lenses 13 and also with corresponding adjustable detents 132, similar to that described. It also will be appreciated that, by virtue of the adjustable character of these detents, each of the associated objective lenses, when in "operating" or "taking" position, may be aligned individually with the rest of the optical system with the desired precision.

It is to be noted that the driver mechanism 81 for the field lens wheel 68 may be adjusted in its mounting on the turret spindle 46 with the necessary precision to effect good optical alignment of the field lenses with their associated turret-mounted objective lenses. This may be accomplished by a suitable manipulation of the clamp screws 84 and 85 as shown particularly in Figure 6. The alternate loosening and tightening of these screws will effect any desired rotational movement of the forked arm 80 about the turret sprindle 46. Any such movement, of course, is transmitted to the stud 78 to effect a corresponding rotation of the field lens wheel 68.

The detent release ring 122 also may be provided with inserts such as 143 having respective locations corresponding to the different locations of the objective lenses 13 in the turret 12. These inserts may be used to inscribe identification data regarding the correspondingly located objective lenses. These lenses, for example, may be identified by their focal lengths or as otherwise desired.

Also, the apparatus may include an infrared, or other, light filter 144 mounted in the aperture 14 of the front end wall 15 by means of a plurality of screws such as 145.

It should be noted that, by reason of the described mounting arrangement of the turret 12, it may easily be removed and replaced without additional alignment adjustments being necessary. Removal of the turret 12 is accomplished by unthreading the nut 48 from the end of the turret spindle 46. The entire turret then may be removed by slipping the hub 47 thereof over the forwardly extending end of the turret spindle. Replacement of the turret may be effected by a series of similar operations performed in the reverse order. In replacing the turret, the original rotational positioning thereof is effected by the cooperative engagement of the key 52 with the slot or recess 51 formed in the flange 49 of the turret spindle 46. The individual objective lenses 13 are screwed into suitably threaded openings in the turret 12 and may be individually changed as desired.

Another feature of the camera apparatus embodying the invention is in the provision made for removing and reinserting the field lenses 16. The aperture 42 in the turret-supporting drum 41 is made somewhat elliptical as illustrated in Figure 4 so as to provide access through the drum to the field lens which is in operative position, when the turret 12 has been removed in the manner described. Each field lens holder, including rings 75 and 76, is provided with a pair of lugs 146 and also has formed therein elongated apertures 147. These apertures are adapted to receive screws 148 threaded into the lens wheel 68. After first loosening the screws 148 the lens holder, together with the lens mounted therein, may be rotated slightly by grasping the lugs 146 so as to bring the enlarged sections of the apertures 147 into alignment with the screws 148. These enlarged sections are so dimensioned as to permit the removal of the lens holder without completely disengaging the screws 148 from the lens wheel. The reverse order of procedure is followed in remounting the lens holder in the wheel 68.

It may be seen from the foregoing description of an illustrative embodiment of the invention that there is provided an improved control mechanism for certain of the optical components of a color television camera in which a plurality of signal-generating tubes is used, whereby to enable the successful manipulation and use of the device under substantially all of the operating conditions to be encountered. More specifically, it is seen that the mechanism embodying the invention enables the rotation of a lens turret so that any one of a plurality of lenses mounted therein may be selected for use, and in addition, permits the back and forth movement of the turret for focusing the selected lens. Furthermore, the apparatus includes detenting mechanisms for indexing the lens-carrying turret in any one of its lens-selecting positions and at any one of the longitudinal positions of the lens turret to which it is adjusted for focusing purposes.

Also, the apparatus provides a mechanism by which to accurately effect the rotational driving of a field lens wheel used in cooperation with the turret-mounted objective lenses so that the lens wheel and the turret may be moved together rotationally in any focusing position of the turret. Incorporated with the driving mechanism is a means for effecting a precise rotational positioning of the field lens wheel so that the different field lenses may be optically aligned suitably with their respective turret-mounted objective lenses.

The described apparatus is of a character to permit relatively easy dismantling of certain parts of the apparatus, such as the detachment of the turret from the main body of the camera and/or the removal and replacement of objective lenses in the turret and/or the field lenses in the field lens wheel. Suitable adjusting facilities are provided to insure the continuous precise alignment of the different parts of the apparatus. One such facility is that provided in the lens-selecting mechanism including the externally mounted handle apparatus, together with the detent-releasing elements thereof. Also, the driving linkage, by means of which the focusing of the optical system is effected, including the threaded driving spindle and associated self-aligning bearing for the internally threaded follower provided for cooperation therewith, enables the focus shaft to be moved longitudinally for focusing the objective lenses with a minimum of interference with the turret shaft, irrespective of any misalignment of the driving mechanism provided therefor. In addition, this type of linkage enables the apparatus to be maintained in the desired focus regardless of the manner in which the camera may be manipulated such as by turning, tilting and the like in its operation.

The nature of the invention may be determined from the foregoing description of an illustrative embodiment thereof. The scope of the invention is defined by the appended claims.

What is claimed is:

1. In a television camera having a housing provided with an aperture in the front end wall thereof, adjustable optical apparatus comprising, an objective lens turret located externally of said housing adjacent said front end wall and provided with a plurality of objective lenses located at mutually spaced points about the center of said turret, a turret spindle attached at its forward end to the center of said turret and extending rearwardly in said housing, a turret shaft having its forward end portion adjacent to the rearwardly extending portion of said turret spindle and extending rearwardly in said housing, a linkage coupling said turret shaft to said spindle for rotative movement therewith, said linkage being of a slidable character to permit longitudinal movement of said spindle relative to said shaft, lens-selecting mechanism attached to the rear end of said turret shaft extending externally of said housing adjacent the rear end wall thereof and operable to rotate said turret to place any selected one of said objective lenses in line with said front end wall aperture, a focus tube linked at its forward end to said turret spindle for longitudinal movement with said spindle and permitting rotative movement of said spindle relative to said tube, said focus tube extending rearwardly in said housing from said spindle and a focusing mechanism linked to the rear end of said focus tube and extending externally of and adjacent the rear of said housing and operable to move said focus tube and said turret spindle longitudinally in said housing, whereby to vary the spacing between said turret and said front end housing wall in any rotated position of said turret and thereby to vary the focus of any selected one of said objective lenses.

2. Adjustable television camera optical apparatus as defined in claim 1 wherein, said turret spindle is hollow at its rear end to receive said turret shaft, and said shaft-to-spindle linkage comprising, a longitudinal slot in the outside of said shaft, and a key mounted in said spindle and engaging said slot in a manner to move longitudinally in said slot but not angularly relative thereto.

3. Adjustable television camera optical apparatus as defined in claim 1 wherein, said focus tube is hollow and extends coaxially with and on the outside of said turret shaft, and said focus tube-to-turret spindle linkage comprising, an annular groove in the outside of said spindle adjacent the rear end thereof, and annular flange means attached to the forward end of said focus tube and engaging said groove in a manner to allow rotation of said spindle but not to move appreciably longitudinally of said spindle.

4. Adjustable television camera optical apparatus as defined in claim 1 wherein, said lens-selecting mechanism comprises a handle including a hand grip rigidly attached to said turret shaft, a detent-releasing bar, said grip having a recess in its inner side to receive said bar, and spring means urging said bar out of said recess toward said housing, said apparatus having additionally a master detent including a roller journaled in said rear housing wall, and a detent release ring having a plurality of recesses at mutually spaced points about its center and rigidly attached to said bar, said recesses being adapted to releasably engage said roller in any lens-selecting position of said mechanism.

5. Adjustable television camera optical apparatus as defined in claim 4 wherein, said detent-releasing bar has an overall thickness somewhat less than the width of said hand grip recess and is undercut at a plurality of points to provide portions of less than said overall thickness, and flat-ended screws extending through the sides of said grip and adjustable to bear upon said undercut portions to permit in-and-out sliding movement of said bar in said recess and to prevent appreciable relative rotative movement of said bar and said grip.

6. Adjustable television camera optical apparatus as defined in claim 1 wherein, said focusing mechanism comprises, an externally threaded driving spindle journaled inside of said housing, an operating handle mounted outside of said housing, means including a gear train linking said handle to said driving spindle, and an internally-threaded driven follower engaged with said spindle and attached to said focus shaft.

7. Adjustable television camera optical apparatus as defined in claim 6 wherein, said spindle follower attachment to said focus shaft comprises, a holder rigidly attached to said focus tube and having a forked extension, and said spindle follower swively-mounted in said forked extension, whereby to permit some rotative and in-and-out sliding movement of said follower in said forked extension.

8. Adjustable television camera optical apparatus as defined in claim 1 wherein, said front end housing wall includes a turret-supporting drum extending forwardly and including said aperture, said turret having an inside diameter sufficiently greater than the outside diameter of said drum to permit free rotative and longitudinal movement of said turret relative to said drum, light-tight longitudinal slot in the outside of said drum, and a plurality of spaced adjustable detents on the inside of said turret, each of said detents being adapted to engage with said slot at any selected lens and focused position of said turret.

9. Adjustable television camera optical apparatus as defined in claim 8 wherein, said adjustable detents each comprise, a substantially cylindrical inwardly-opening retainer having mounting lugs, a spring-pressed ball in said retainer urged toward engagement with said drum slot, and means including said mounting lugs for adjustably positioning said retainer on said turret.

10. In a television camera having a housing including a turret-supporting drum provided with an aperture and extending forwardly from the front end wall of said housing, adjustable optical apparatus comprising, an objective lens turret having a plurality of objective lenses located at mutually spaced points about the center of said turret, said turret being adapted to move rotatively and longitudinally relative to said drum, a turret spindle extending rearwardly in said housing and also forwardly through said drum, said turret being detachably secured to the forward end of said spindle, a turret shaft slidably keyed to said spindle for rotative movement therewith and permitting longitudinal movement of said spindle relative to said shaft, said turret shaft extending rearwardly in said housing from said spindle, lens-selecting mechanism secured to the rear end of said turret shaft and extending through the rear end wall of said housing for manipulation to rotate said turret to place any selected one of said objective lenses in line with said drum apertures, a focus tube mounted coaxially with said turret shaft and linked to said turret spindle for longitudinal movement therewith and permitting rotative movement of said spindle relative to said tube, a focusing mechanism linked to said focus tube and extending through a wall of said housing adjacent the rear thereof for manipulation to vary the longitudinal spacing of said turret relative to said drum, a field lens wheel supporting a plurality of field lenses in respective positions corresponding to the positions of said turret-mounted objective lenses, said field lens wheel being mounted within said drum for rotation about said turret shaft but not for longitudinal movement relative to said drum, and a driving linkage coupling said field lens wheel and said turret shaft to rotate said wheel to place the field lens corresponding to any selected objective lens in line with said drum aperture.

11. Adjustable television camera optical apparatus as defined in claim 10 wherein, said field lens wheel mounting including a main bearing attached to said turret supporting drum and internally providing a journal for said turret spindle and externally providing an axle for said wheel.

12. Adjustable television camera optical apparatus as defined in claim 10 wherein, said driving linkage for said field lens wheel includes a stud attached to and extending from said wheel substantially perpendicular to the general plane of rotation of said wheel, and a forked driver attached to said turret spindle for rotation therewith and with said forked portion engaged with said stud for effecting rotative movement with and longitudinal movement relative to said stud.

13. Adjustable television camera optical apparatus as defined in claim 12 wherein, said forked driver attachment includes a two-part arcuate clamp, both parts of which having lugs extending from the ends of the respective arcuate portions, a first part of which being secured to said driver at the end thereof opposite to the fork and the second part of which being detachably fastened to said first part by screw means through corresponding ones of said lugs, said screw means being adjustable to vary the rotational position of said field lens wheel suitably to optically align said field lenses with their respectively associated objective lenses.

14. Adjustable television camera optical apparatus as defined in claim 13 wherein, said screw means are machine screws extending through clearance holes in the lugs of one of said clamp parts into tapped holes in the lugs of the other of said clamp parts.

HERBERT C. SHEPARD.

REFERENCES CITED

The following references are of record in the file of this patent:

UNITED STATES PATENTS

| Number | Name | Date |
|---|---|---|
| 2,000,090 | Mitchell | May 7, 1935 |
| 2,005,014 | Tondreau | June 18, 1935 |
| 2,488,177 | Dufour | Nov. 15, 1949 |